United States Patent
Gunturi et al.

(10) Patent No.: US 7,970,082 B2
(45) Date of Patent: Jun. 28, 2011

(54) FREQUENCY OFFSET CORRECTION WHEN DECODING A PACKET ENCODED IN A FREQUENCY MODULATED SIGNAL

(75) Inventors: Sarma Gunturi, Karnataka (IN);
Madhan Mohan Jaganathan, Tamil Nadu (IN)

(73) Assignee: Texas Instruments Incorporated, Dalla, TX (US)

( * ) Notice: Subject to any disclaimer, the term of this patent is extended or adjusted under 35 U.S.C. 154(b) by 943 days.

(21) Appl. No.: 11/770,809

(22) Filed: Jun. 29, 2007

(65) Prior Publication Data
US 2009/0003469 A1  Jan. 1, 2009

(51) Int. Cl.
*H04L 27/06* (2006.01)
(52) U.S. Cl. ... 375/340; 375/347; 375/316; 375/240.27; 370/208; 714/746
(58) Field of Classification Search .......... 375/340, 375/316, 347, 240.27; 370/208; 714/746
See application file for complete search history.

(56) References Cited

U.S. PATENT DOCUMENTS

| | | | |
|---|---|---|---|
| 7,123,670 B2 | 10/2006 | Gilbert et al. | |
| 7,408,976 B1* | 8/2008 | Narasimhan et al. | 375/148 |
| 2005/0058193 A1 | 3/2005 | Saed | |
| 2006/0222095 A1 | 10/2006 | Niu et al. | |
| 2006/0239370 A1 | 10/2006 | Mody et al. | |

OTHER PUBLICATIONS

T.M.Schmidl and D.Cox,"Robust frequency and timing synchronization for OFDM",IEEE Transactions in Communications,pp. 1613-1621,vol. 45, No. 12, Dec. 1997.

* cited by examiner

*Primary Examiner* — Chieh M Fan
*Assistant Examiner* — Leila Malek
(74) *Attorney, Agent, or Firm* — Steven A. Shaw; W. James Brady; Frederick J. Telecky, Jr.

(57) ABSTRACT

Embodiments include frequency offset correction when decoding a packet encoded in a frequency modulated signal. Different symbols encoded in the packet may be corrected by different frequency offsets. In an embodiment, the frequency modulated signal is received on one of the signals of a multi-carrier signal (e.g., based on Orthogonal Frequency Domain Multiplexing, OFDM) and each packet is encoded according to 802.11(a) having the same long sequence repeating multiple times in a header portion. The repetitive sequence is used to compute the different offsets for different symbols.

4 Claims, 6 Drawing Sheets

US 7,970,082 B2

FREQUENCY OFFSET CORRECTION WHEN DECODING A PACKET ENCODED IN A FREQUENCY MODULATED SIGNAL

BACKGROUND

1. Technical Field

The present disclosure relates generally to communication systems, and more specifically to a technique for offset correction when decoding a packet encoded in a frequency modulated signal.

2. Related Art

Packet is used as a basic unit for transferring data. A packet contains a header and a payload, with the header operating to serve one or more purposes such as packet detection, synchronization, error correction, destination, etc., depending upon the environment. The payload contains the data sought to be transferred.

Frequency modulation is often used to encode the desired data. In a typical scenario, the desired data is represented as a set of symbols, and the frequency of a carrier signal is modulated to represent the symbols. The modulated signal is then transmitted to a receiver, which needs to decode the data.

A receiver needs to perform frequency offset correction when decoding a received signal. Frequency offset correction is often required for reasons such as the center frequency of the carrier signal used at the sender not being identical/equal to that of the carrier signal used for decoding, frequency drift of synthesizers in transmitter or receiver, etc.

Without accurate offset correction, the symbols may not be accurately decoded.

BRIEF DESCRIPTION OF THE DRAWINGS

The present invention will be described with reference to the following accompanying drawings, which are described briefly below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

Overview

An aspect of the present invention provides for different offset corrections to different symbols within a packet encoded in a frequency modulated signal. As a result, the symbols may be recovered accurately.

In an embodiment, the offset corrections applicable to different sampling instants (corresponding to symbols) are determined based on a repetitive sequence contained in the received packet. Each repeating sequence may be viewed as being received in a duration, and the symbols in corresponding sub-durations may be correlated to determine the offsets.

The above features are described as being implemented in a 802.11 standard with the long sequences in the header constituting the repetitive sequences.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the features of the invention.

2. EXAMPLE MULTI-CARRIER TELECOMMUNICATION SYSTEM

Figure 1:
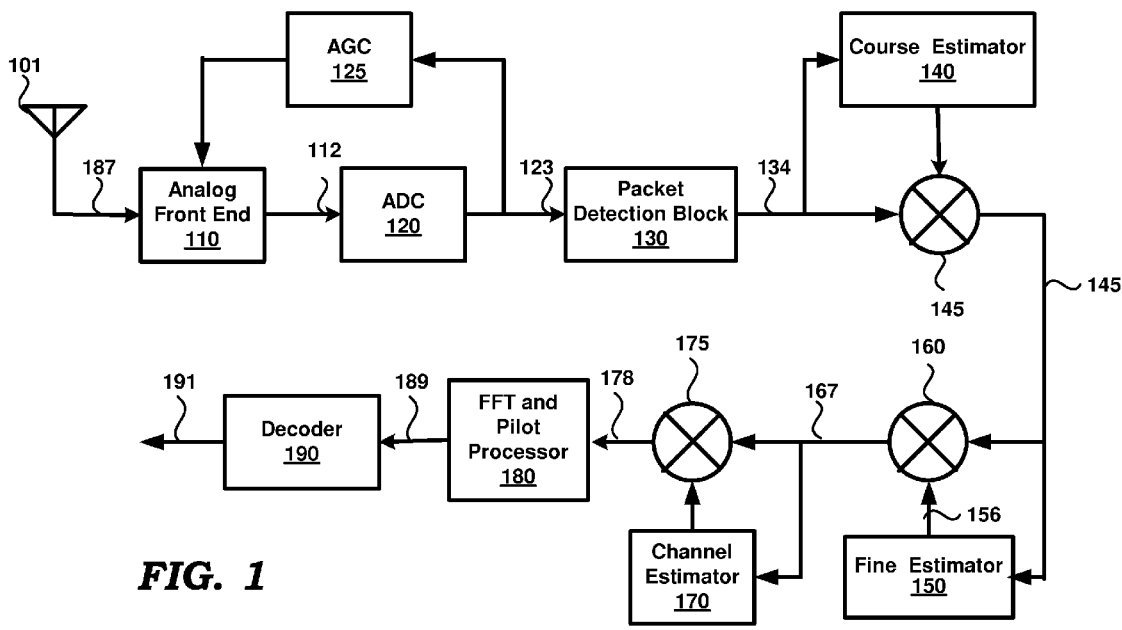
FIG. 1 is a block diagram illustrating an example multi-carrier receiver in which several aspects of the present invention can be implemented.

FIG. 1 is a block diagram illustrating an example receiver in which several aspects of the present invention can be implemented. The block diagram is shown containing receiving antenna 101, analog front end 110, analog to digital converter (ADC) 120, auto gain control (AGC) 125, packet detection block 130, course estimator 140, fine estimator 150, channel estimator 170, multipliers 145, 160 and 175, pilot processor 180 and decoder 190. Each block in FIG. 1 is described below in further detail.

Antenna 101 receives a frequency modulated signal encoding a set of symbols in the form of a packet. The multi-carrier signal represents one of the frequency modulated signal. The multi-carrier signal may be centered around a high frequency. In an embodiment, the multi-carrier signal is encoded according to 802.11(a) standard.

Analog front end 110 performs any needed down-conversions to represent the frequency modulated signal in an intermediate (lower compared to the high frequency) frequency, as suited for downstream processing by components described below. The output represents the multi-carrier signal in a base-band frequency.

ADC 120 samples the down converted signal and generates a sequence of digital values (samples) representing the symbols. The signal may be sampled at a much higher frequency than the signal bandwidth (frequency band occupied by a signal). Thus, each symbol may span multiple samples (digital values). AGC 125 examines the digital values and adjusts the gain of analog front end 110, to possibly be able to use the complete dynamic range of the ADC.

Packet detection block 130 detects the start of each packet, as well as the boundaries of various portions of interest within each packet, by examining the digital values received on path 123. Packet detection block 130, ADC 120, AGC 125 and ADC 120 may be implemented in a known way.

Course estimator 140 and multiplier 145 together operate to provide a first (coarse) level of frequency offset correction to the packet (digital values). In general, course estimator 140 determines the extent of correction required and multiplier 145 performs the correction (by appropriate multiplication operation). In the case of 802.11(a), the short sequence (noted in FIG. 3) is used to determine the course frequency offset, in a known way.

Fine estimator 150 and multiplier 160 operate to perform frequency offset correction at a finer level (at more precision) of accuracy according to an aspect of the present invention. Different samples are corrected with different frequency offsets, and the manner in which the offsets are computed is described with examples in sections below. The offset correction is expressed in the form of values which are used by multiplier as a multiplicand (with the values received on path 156) to provide the desired correction.

Channel estimator 170 and multiplier 175 operate to provide corrections for any errors due to attenuation at different frequency locations introduced due to channel (outside of antenna, during reception) characteristics. In an embodiment described, the header portion providing attenuation correction information (for the channel) is corrected by fine estimator 150, and thus the channel characteristics may be estimated accurately. In the case of 802.11(a) standard, the attenuation correction information is contained as a known (predetermined) symbols in the long sequence (shown in FIG. 3).

FFT and Pilot processor 180 receives the corrected digital values (and thus the corrected symbols) and forwards only the symbols corresponding to the data (user applications related) sought to be transported by the packet. In case of a multi carrier system, each symbol may be associated with one of the carriers (of the multi-carrier signal). Accordingly, a Fast Fourier Transform (FFT) is performed on the received digital values to separate the symbols corresponding to each carriers. Decoder 190 generates the digital codes corresponding to the symbols, and provides the decoded values on path 191. The stream of values corresponding to symbols on each carrier may be provided on a separate path (not shown) and/or to corresponding destination.

Due to the frequency offset correction at a finer level noted above, the digital codes may be recovered more accurately. The manner in which the frequency offset may be determined is described below with examples.

3. DYNAMIC FREQUENCY OFFSET

Figure 2:
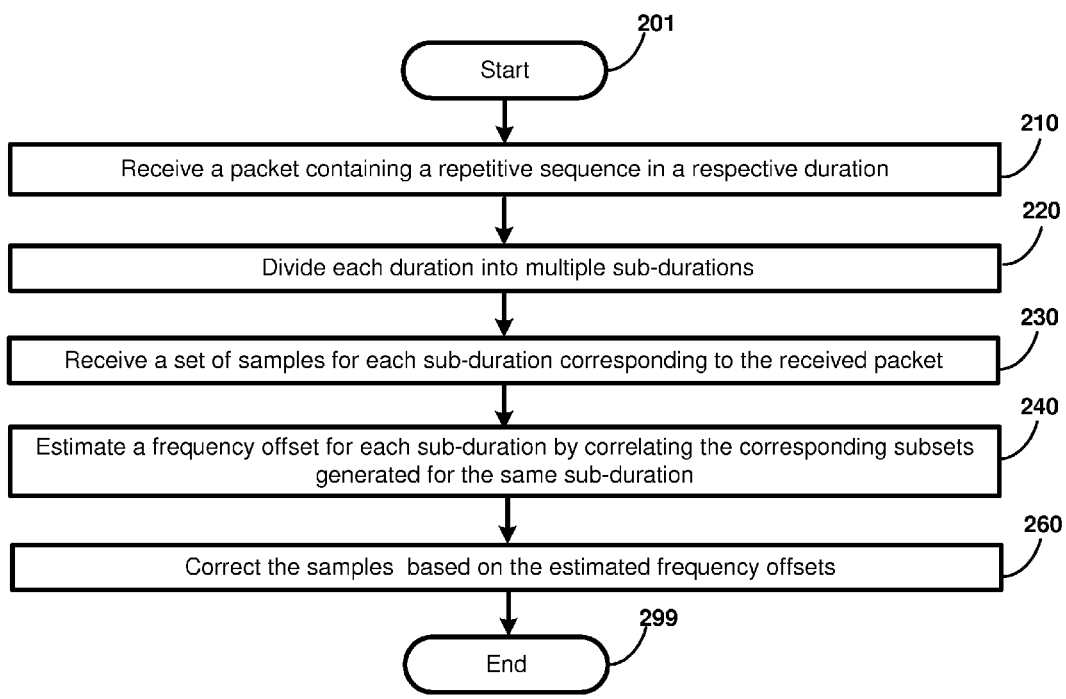
FIG. 2 is a flowchart illustrating the manner in which a multi-carrier receiver corrects for a carrier frequency offset according to several aspects of the present invention.

FIG. 2 is a flowchart illustrating the manner in which a multi-carrier receiver corrects for a carrier frequency offset according to several aspects of the present invention. The flowchart is described with respect to FIG. 1 and FIG. 3 merely for illustration. However, various features can be implemented in other environments and using other components. Furthermore, the steps are described in a specific sequence merely for illustration.

Figure 3:
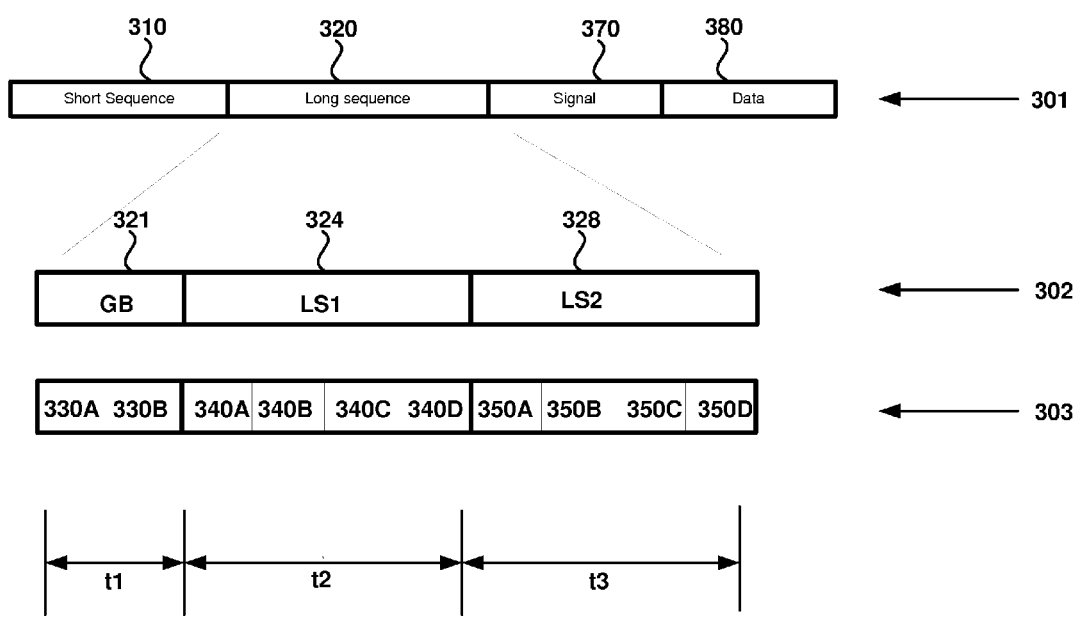
FIG. 3 illustrates example durations, sub durations and repetitive sequence in 802.11a packet format.

FIG. 3 illustrates example durations, sub-durations and repetitive sequence in 802.11a packet format, wherein 301 represents the details of a packet format according to 802.11a protocol, 302 represents the details (durations) of a long sequence (example of repetitive sequence) contained in packet 301, and 303 represents the various sub durations in an embodiment.

Alternative embodiments in other environments, using other components, and different sequence of steps can also be implemented without departing from the scope and spirit of several aspects of the present invention, as will be apparent to one skilled in the relevant arts by reading the disclosure provided herein. The flowchart starts in step 201, in which control passes immediately to step 210.

In step 210, fine estimator 150 receives a packet containing a repetitive sequence in a respective duration. A repetitive sequence implies that the same symbol values are repeatedly present in the packet. For example, in the case of the packet format of 802.11(a) shown in FIG. 3, long sequence field 320 contains multiple sequences LS1 324 and LS2 328, with both the sequences being designed to have the same symbols. Each sequence is received for 3.2 micro-seconds of duration.

In step 220, fine estimator 150 logically divides each duration into multiple sub-durations. Thus duration 324 is shown divided as 340A-340D, and duration 328 is shown divided as 350A-350D. It may be appreciated that duration 340A and 350A are corresponding sub-durations, 340B and 350B are corresponding sub-durations, etc., with the same symbols expected in the corresponding sub-durations. The sub-durations are chosen to be equal in length, though different sub-durations can be of different length so long as the corresponding sub-durations have the same length.

In step 230, fine estimator 150 receives a set of samples for each sub-duration corresponding to the received packet. For example, sixty four samples may be received for the signal received in sub-duration 340A of 0.8 micro-seconds (assuming four equal sub-durations) corresponding to 256 samples in duration 324 (duration with respect to 802.11(a)).

In step 240, fine estimator 150 estimates the frequency offset for each sub-duration by correlating the corresponding subsets generated for the same sub-duration. Thus the symbols samples corresponding to duration of 340A are correlated with the corresponding samples of 350A to generate a value representing the frequency (phase) offset. Four different frequency offsets may be generated corresponding to the four sub-durations.

In step 260, fine estimator 150 corrects the samples based on the estimated frequency offsets for the respective durations. The flowchart ends in step 299.

While the features of the invention are described above with respect to examples for illustration, it should be appreciated that some of the features can be implemented in frequency modulated signals, even when not received as a part of multi-carrier signals.

The manner in which different frequency offsets are computed within an embodiment of the present invention is described below.

4. COMPUTATION OF FREQUENCY OFFSETS FOR SAMPLES

Figure 4A:
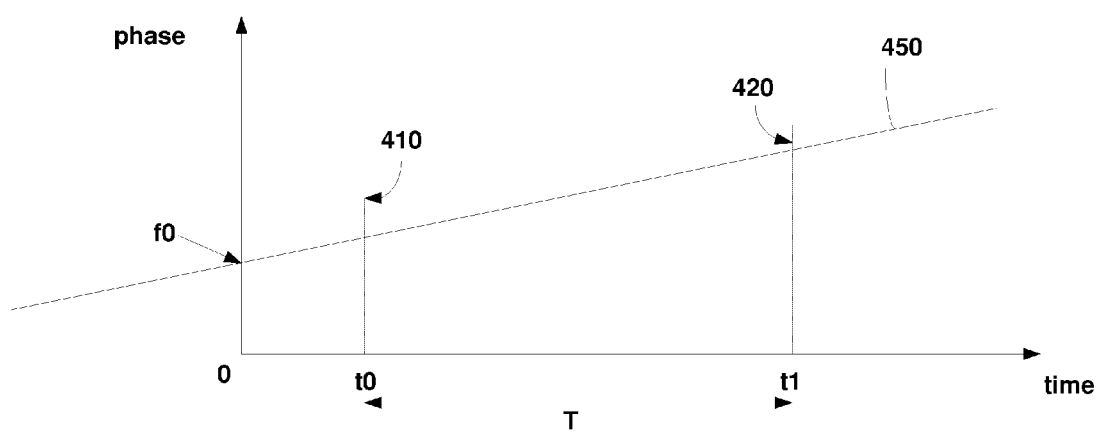
FIG. 4A is a graph illustrating the manner in which frequency offset may be computed for each sub durations by correlation.

FIG. 4A is a graph illustrating the manner in which frequency offset may be computed for each sub-duration by correlation. In the graph, X-axis represents the time and Y-axis the phase angle of the sample. The description is provided for a linear variation of frequency offset within the packet, however other approximation curve (functions) can be used for determining the offset.

Curve 450 represents the variation of phase of the samples corresponding to the respective time instance. Point 410 represents a sample at time $t_0$ in a first sub-duration (e.g., in 340A), and point 420 represents the corresponding repeated sample at time $t_1$ after a time interval T (3.2 micro seconds in case of 802.11(a)) in second sub-duration (e.g., 350A), wherein T equals the length of each repeated sequence.

Mathematically, curve 450 may be represented as:

$$f(t)=f_0+bt \qquad \text{Equation (1)}$$

wherein $f_0$ represents the intercept point as shown in FIG. 4, b represents the slope of the curve 450 and t represents the time.

Sample 410 at time $t_0$ may be represented in time domain as $$x_1 e^{j\theta_0}$$

wherein $\theta_0$ represents the phase at time $t_0$ and $x_1$ represents the magnitude/strength of the sample. From equation 1, the phase angle $\theta_1$ of sample 420 after time T (3.2 micro seconds in case of 802.11a) may be computed as:

$$\theta_1 = \theta_o + \int_t^{t+T} (f_o + bt)dt \quad \text{Equation (2)}$$

Hence the samples 420 may be represented as $x_1 e^{j\theta_1}$. The accumulated phase angle between sample 410 and 420 may be represented as:

$$R_{xx}(i) = (x_1 e^{j\theta_0})^* x_1 e^{j\theta_1} \quad \text{Equation (3)}$$

wherein * represents a complex conjugate operation and the remaining terms are defined above.

Equation 3 represents the correlation between the samples 410 and 420. $R_{xx}(i)$ represents the accumulated phase which may be equated to the accumulated phase computed based on the curve 450 as:

$$\begin{aligned} R_{xx}(i) &= (x_1 e^{j\theta_0})^* x_1 e^{j\theta_1} \quad \text{Equation (4)} \\ &= \theta_{accum} \\ &= \int_t^{t+T} (fo + bt)dt \\ &= foT + \frac{b}{2}(2tT + T^2) \end{aligned}$$

An estimate of average frequency ($f_{av}$) deviation between sample 410 and 420 may be obtained by dividing the accumulated phase by the time duration T.

$$f_{av} = \theta_{accum}/T$$

From Equation 1, and 4 the average frequency may be represented as:

$$\begin{aligned} f_{av} &= \theta_{accum}/T \quad \text{Equation (5)} \\ &= fo + bt + \frac{bT}{2} \\ &= f(t) + \frac{bT}{2} \\ &= f(t+T) - \frac{bT}{2} \end{aligned}$$

From equation 5, it may be seen that the frequency estimate $f_{av}$ at time $t_0$ and $t_1 = t_0 + T$ differ by a factor $bT/2$. This factor represents the correction factor for a duration T (3.2 micro seconds).

From equation 5, it may be appreciated that the correction factor depends on the slope b. Accordingly the slope b may be determined by computing the $f_{av}$ for a time interval as $T/n$ (sub durations) where n represents the number of sub duration. With reference to FIG. 3, n=4. Accordingly, the time interval t takes a value of t=t to t=t+T/4 corresponding to each sub-duration (0.8 micro seconds) in equation 2 and 4. The $f_{av}$ at each sample instant in a sub-duration may be further averaged to mitigate the effect of receiver background noise on the average frequency estimate. As a result, n (in this embodiment n=4) different $f_{av}$ values are computed per equation 2-5 and a line (example 450) to match the $f_{av}$ by a least square method.

Figure 4B:
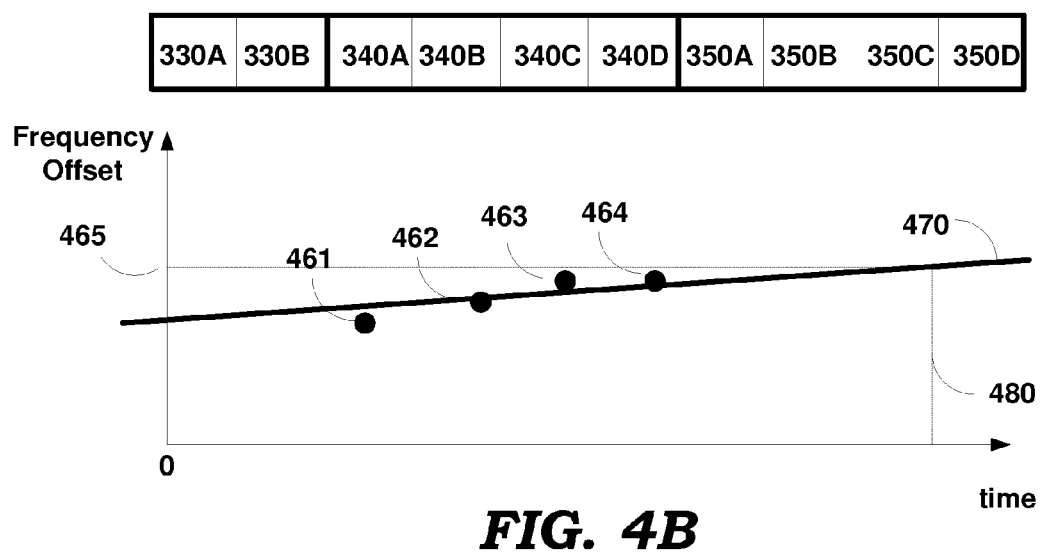
FIG. 4B illustrates the manner in which the four frequency offsets corresponding to four sub-durations are used to determine a frequency offset value for a sample at time t.

FIG. 4B illustrates the manner in which the four frequency offsets corresponding to four sub-durations are used to determine a frequency offset value for a sample at time t. Points 461-464 represents the Fav values for respective sub-durations 340A-340D computed according to the descriptions above. Line 470 represents the linear function that is fit to points 461-464 by least square approach, well known in the relevant arts.

When processing the samples at a give time (t), the corresponding frequency offset may be obtained from line 470. As an illustration, frequency 465 represents the offset correction to be performed for a sample received at time 480 from the curve (line 470) as shown in FIG. 4B.

Though the description provided for a multi-carrier FM signal, the features may be used for decoding the packets modulated using a Frequency modulated technique. In such a case, the set of components in FIG. 1, except antenna 101, may be used for each of the frequency modulated signals.

A receiver thus implemented can be used in several types of embodiments. The details of an example embodiment are provided below for illustration.

5. DEVICE

Figure 5:
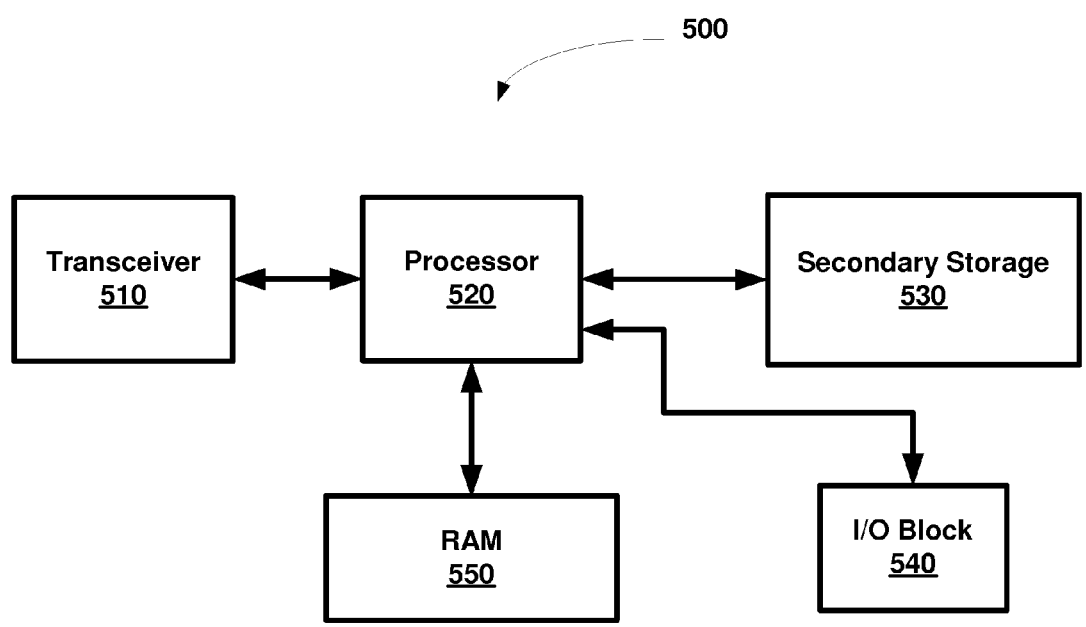
FIG. 5 represents an example device in which several aspects of the present invention can be implemented.

FIG. 5 represents an example device in which several aspects of the present invention can be implemented. The device may correspond to computers, phones, hand-held devices, multi-media devices, home appliances, etc., which need to communicate using frequency modulated signals (on wire-based or wireless paths), as noted above.

Transceiver 510 may contain both a transmitter and a receiver, with the receiver being implemented using the features described above. The transmitter transmits any data (received from processor 520) as a frequency modulated signal. The receiver receives the data (as described above) and forwards the decoded data to processor 520. In an embodiment, transceiver 510 is implemented according to 802.11(a) standard.

Processor 520 generates digital data for transmission, in addition to processing the received decoded data. Processor 520 may access various instructions and data from RAM 550 to generate data and process the decoded data. RAM 550 may be implemented using any commercially available memories.

Secondary storage 530 provides non-volatile storage for storing data/instructions corresponding to user applications. The instructions/data may be retrieved into Ram 550 prior to execution.

I/O block 540 may provide various input/output ports. The input ports may be used to receive user inputs and the output ports may be used to provide data in a corresponding desired format (e.g., voice/display signals/video, etc.).

6. CONCLUSION

While various embodiments of the present invention have been described above, it should be understood that they have been presented by way of example only, and not limitation. Thus, the breadth and scope of the present invention should not be limited by any of the above-described embodiments, but should be defined only in accordance with the following claims and their equivalents.

What is claimed is:

1. A method of processing an input signal having encoded therein a plurality of symbols in the form of a packet using frequency modulation, wherein said plurality of symbols containing a repetitive sequence comprised in said plurality of symbols, said method comprising:
   receiving said packet containing said plurality of symbols;
   correcting a first symbol by a first frequency offset and a second symbol by a second frequency offset, wherein said first symbol and said second symbol are contained in said plurality of symbols and wherein said first frequency offset is not equal to said second frequency offset;

estimating said first frequency offset and said second frequency offset, via a hardware estimator, by examining said repetitive sequence, wherein said repetitive sequence includes a first set of symbols and a second set of symbols which are respectively received in a first duration and a second duration, wherein each of said first duration and said second duration having a respective plurality of sub-durations, wherein said estimating comprises:

correlating a first subset of symbols with a second subset of symbols, wherein said first subset of symbols and said second subset of symbols are received in the same corresponding sub-duration in said first duration and said second duration respectively, wherein said first frequency offset is computed based on a result of said correlating;

forming a linear relationship with respect to time which specifies the magnitude of frequency offset for corrections during all of said first duration and second duration, wherein each symbol in said first duration and said second duration is corrected based on said relation; and decoding said first symbol and said second symbol after said correcting to generate a first decoded value and a second decoded value.

2. The method of claim 1, wherein said repetitive sequence is contained in a header portion of said packet.

3. The method of claim 2, wherein said input signal is contained in a multi-carrier signal, wherein said input signal is modulated using Orthogonal Frequency Division Multiplexing (OFDM).

4. The method of claim 3, wherein each of said first duration and said second duration corresponds to a long sequence.

\* \* \* \* \*